Patented Oct. 8, 1929

1,731,152

UNITED STATES PATENT OFFICE

CLEMENS SCHÖPF, OF MUNICH, GERMANY, ASSIGNOR TO THE FIRM C. H. BOEHRINGER SOHN, OF NIEDER-INGELHEIM-ON-THE-RHINE, GERMANY, A SOCIETY OF GERMANY

PROCESS FOR THE MANUFACTURE OF DERIVATIVES OF DIHYDROCODEINONE OR ITS SUBSTITUTION PRODUCTS

No Drawing. Application filed October 13, 1928, Serial No. 312,393, and in Germany October 27, 1925.

This invention relates to the manufacture of derivatives of dihydro-codeinone or its substitution products.

It is already known that on treating hydrogenated keto derivatives of the morphine series which contain one hydroxy group in ring 3 with acylation agents, acylation of this hydroxyl group takes place.

It has now been found that when dihydro-codeinone

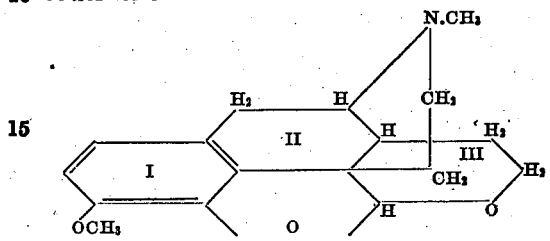

or its substitution products or salts thereof, in which ring 3 contains no hydroxyl group, for example brom-dihydro-codeinone, are subjected to acylation by the usual methods, new acyl derivatives are obtained which contain the acyl residue in ring 3.

Acylation is preferably effected by treating the initial material with an excess of organic acid anhydride. Thus for example, by treating dihydro-codeinone with acetic anhydride, acetyl dihydro-codeinone is obtained which can be crystallized from alcohol in which it is much more soluble than dihydro-codeinone. Its melting point at 154° to 155° C. The chlorhydrate crystallizes from water in the form of fine needles having a melting point of 132–135° C. with decomposition. Also other acylating agents such as acetylchloride may be used.

Example 1

7.7 grams of dihydro-codeinone are heated with 40 ccs. of acetic anhydride for two-and-a-half hours under a reflux condenser, and the acetic anhydride and glacial acetic acid are then distilled off in vacuo. The oily residue is dissolved in water. In order to remove the last residues from the acetic anhydride it is extracted with ether. The new base is then precipitated with ammonia and crystallizes out immediately on addition of a small quantity of ether.

The chemical analysis of the substance obtained corresponds to the values calculated for mono-acetyl-dihydro-codeinone. The presence of an acetyl-group can be shown by the usual method of acetyl determination by saponification with concentrated sulphuric acid.

Example 2

4 grams of dihydro-codeinone are kept slowly boiling for three hours under a reflux condenser with 14 grams of butyric anhydride. The excess butyric anhydride is distilled off in vacuo, and the residue is treated with ether and the base extracted by shaking with acetic acid. The n-butyryl-dihydro-codeinone is liberated on adding ammonia to the acetic acid solution and taken up in ether, in the form of a non-crystalline resin, in practical quantitative yield. The methiodide of the n-butyryl-dihydro-codeinone crystallizes from alcohol in rectangular plates which on heating to 125° C. froth slightly and melt at 220–222° C. The brom-hydrate of the n-butyryl-dihydro-codeinone melts at 225° C. on being crystallized twice from dilute methyl alcohol.

Example 3

5 grams of dihydro-codeinone are heated with 20 grammes of benzoic-anhydride to about 200° C. for three hours on an oil bath. After cooling, the mass is taken up with a large quantity of ether and the benzoyl compound is extracted from the ether by continued shaking with dilute acetic acid. After conversion into the base and taking up in ether, extraction by shaking with acetic acid, precipitation with ammonia and again taking up with ether, the benzoyl compound is obtained as a colourless non-crystalline resin. The methiodide of the benzoyl hydrocodeinone after re-crystallization from glacial acetic acid and methyl alcohol melts at 240°–242° C. with frothing.

Example 4

8 grams of brom-dihydro-codeinone are boiled with 50 ccs. acetic anhydride for 2 or 3 hours under a reflux condenser. The reaction mixture is then treated as in Example 1. The chemical properties of the acetyl brom-dihydro-codeinone are analogous to those of acetyl-dihydro-codeinone. It melts at 160–162° C. and crystallizes from alcohol in the form of short massive prisms. The bromhydrate of the acetyl-brom-dihydro-codeinone which can be obtained from water in the form of beautiful crystals, melts at 128–132° C.

The products obtained according to the invention, which are probably acylcompounds of the enol form, are stable in the form of salts even when their aqueous solutions are boiled for a long period. They are only split up on boiling with concentrated acids when the original keto bases are re-formed. The compounds are applicable in therapy.

I claim:

1. A method for making derivatives of dihydro-codeinone which consists in treating dihydro-codeinone with acylating agents.

2. A method for making derivatives of dihydro-codeinone which consists in treating substitution products of dihydro-codeinone, in which ring 3 contains no hydroxyl group, with acylating agents.

3. A method for making derivatives of dihydro-codeinone which consists in treating halogen substitution products of dihydro-codeinone, in which ring 3 contains no hydroxyl group, with acylating agents.

4. A method for making derivatives of dihydro-codeinone which consists in treating dihydro-codeinone with acetylating agents.

5. A method for making derivatives of dihydro-codeinone which consists in treating dihydro-codeinone with acetic acid anhydride.

6. A method for making derivatives of dihydro-codeinone which consists in treating substitution products of dihydro-codeinone, in which ring 3 contains no hydroxyl group, with acetylating agents.

7. A method for making derivatives of dihydro-codeinone which consists in treating substitution products of dihydro-codeinone, in which ring 3 contains no hydroxyl group, with acetic acid anhydride.

8. As a new product of manufacture an acylated dihydro-codeinone, which contains the acyl residue in ring 3.

9. As a new product of manufacture an acetylated dihydro-codeinone, which contains the acetyl residue in ring 3.

10. As a new product of manufacture an acylated dihydro-codeinone, which contains the acyl residue in ring 3, and other substitutents in one of the other rings.

11. As a new product of manufacture an acylated and halogenated dihydro-codeinone, which contains the acyl residue in ring 3.

In testimony whereof I affix my signature.

Dr. CLEMENS SCHÖPF.